Figure 1:
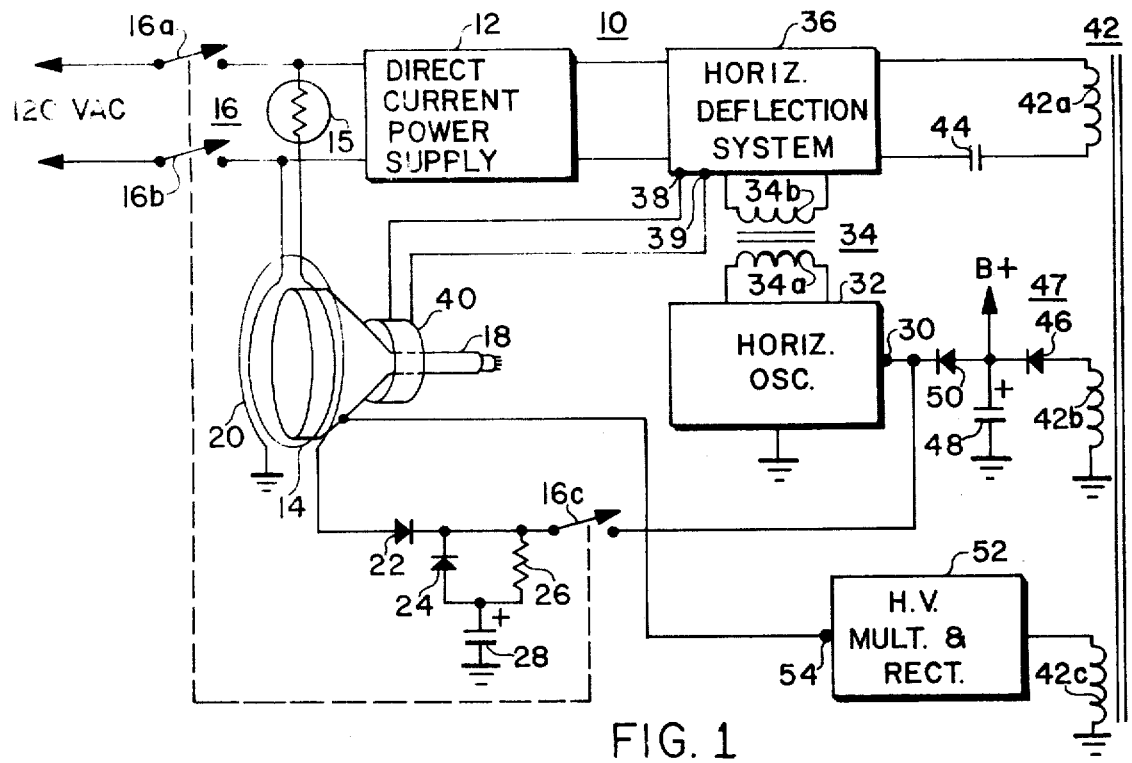

United States Patent [19]
Giger et al.

[11] 3,947,632
[45] Mar. 30, 1976

[54] START-UP POWER SUPPLY FOR A TELEVISION RECEIVER

[75] Inventors: Robert John Giger; James Michael Lawrence, both of Indianapolis, Ind.

[73] Assignee: RCA Corporation, New York, N.Y.

[22] Filed: July 23, 1975

[21] Appl. No.: 598,296

[52] U.S. Cl. ............... 178/7.5; 178/DIG. 11; 315/8; 315/395; 358/74
[51] Int. Cl.² ........................................ H01J 29/06
[58] Field of Search ....... 178/DIG. 11, 7.3 R, 7.5 R; 315/8, 395; 358/74

[56] References Cited
UNITED STATES PATENTS

| | | | |
|---|---|---|---|
| 3,603,732 | 9/1971 | George | 178/DIG. 11 |
| 3,798,493 | 3/1974 | Manske | 315/8 |
| 3,824,338 | 7/1974 | Suzuki et al. | 178/DIG. 11 |
| 3,878,326 | 4/1975 | Fitzgerald, Jr. | 178/DIG. 11 |

*Primary Examiner*—Robert L. Griffin
*Assistant Examiner*—Aristotelis M. Psitos
*Attorney, Agent, or Firm*—E. M. Whitacre; Paul J. Rasmussen

[57] ABSTRACT

A degaussing winding adapted to be coupled to a first source of varying amplitude alternating current potential develops a degaussing flux in the proximity of a television picture tube during a degaussing interval. A secondary winding coupled to the degaussing winding supplies current to a power supply network to develop a first direct current potential during the degaussing interval. A further aspect includes means coupling the first direct current potential to a horizontal oscillator to enable start-up of the horizontal oscillator which provides for the development of a second direct current potential by the horizontal deflection system. The second direct current potential is coupled to the horizontal oscillator and sustains operation of the horizontal oscillator after the start-up interval.

11 Claims, 2 Drawing Figures

U.S. Patent   March 30, 1976   3,947,632

START-UP POWER SUPPLY FOR A TELEVISION RECEIVER

BACKGROUND OF THE INVENTION

This invention relates to a start-up power supply for a television receiver.

It is preferable to manufacture "cold" chassis designs for television receivers in which the power line is isolated from as much of the chassis as possible to minimize the possibility of electrical shock to the operator. One cold chassis design does not utilize a power line frequency (i.e., 60 Hz) transformer but develops directly from the power line a direct current potential necessary to provide power to the horizontal deflection system. The high voltage transformer which is driven by the horizontal deflection system operates at approximately 15,750 Hz and provides various amplitudes of 15,750 Hz alternating current voltages on various isolated windings for developing direct current potential (B+) sources for operating various television receiver circuits. This technique reduces greatly the receiver transformer weight and still provides cold chassis operation.

The horizontal oscillator required to drive the horizontal deflection system is generally isolated from the power line and, therefore, must be provided an isolated source of B+. Since the isolated source of B+ obtained from the high voltage transformer is not developed until the horizontal oscillator is in operation, an isolated source of B+ must be provided during a start-up interval.

SUMMARY OF THE INVENTION

A start-up power supply for a television receiver includes a degaussing winding adapted to be coupled to a first source of alternating circuit potential and adapted to be coupled in proximity to display means such as a television picture tube for developing a degaussing flux in the display means during a degaussing interval. A secondary winding coupled to the degaussing winding develops a second alternating current potential proportional to the amplitude of the degaussing flux during the degaussing interval. Power supply means coupled to the secondary winding develops a first direct current potential during said degaussing interval.

Figure 2:
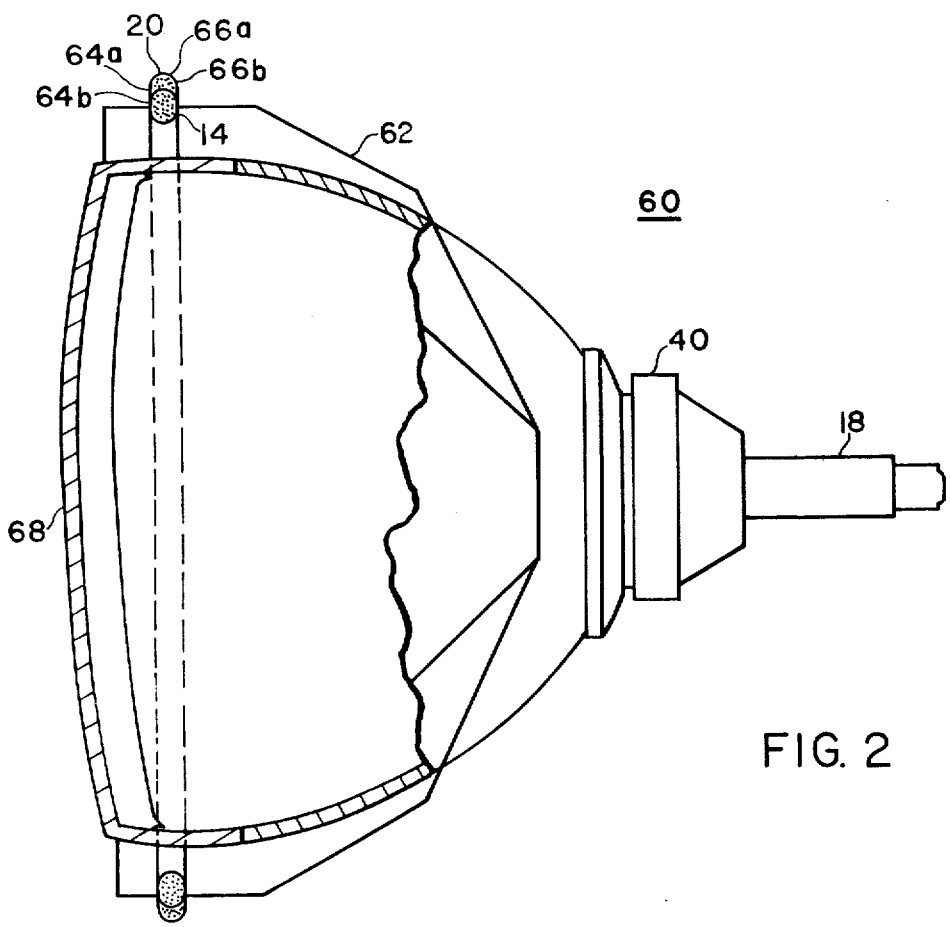

A more complete description of the invention is given in the following description and accompanying drawing of which:

FIG. 1 is a block diagram, partially in schematic form, of a start-up power supply for a television receiver embodying the invention; and FIG. 2 is a lateral section view of a kinescope, magnetic shield and degaussing coil assembly embodying the invention.

DESCRIPTION OF THE INVENTION

In FIG. 1 a source of alternating current potential (not shown) is coupled to a direct current power supply 12 and the series combination of a degaussing winding 14 and a positive temperature coefficient resistor 15 by means of sections 16a and 16b of a power off-on switch 16. Degaussing winding 14 produces a degaussing flux in the proximity of a kinescope 18, thereby providing for degaussing of metal components of the kinescope 18. The degaussing winding 14 is also magnetically coupled to a secondary winding 20. Secondary winding 20 is coupled in series combination between reference potential and the anode of a rectifying diode 22. The cathode of diode 22 is coupled through a parallel combination of a diode 24 and a resistor 26 to a storage capacitor 28. The negative terminal of capacitor 28 is coupled to reference potential. The cathode of diode 22 is also coupled through a section 16c of off-on switch 16 to a B+ input terminal 30 of a horizontal oscillator 32.

The horizontal oscillator 32 is coupled to reference potential and to a winding 34a of an isolation transformer 34. When B+ is applied to terminal 30 of horizontal oscillator 32, a drive signal is developed across winding 34a of isolation transformer 34. A winding 34b of isolation transformer 34 is magnetically coupled to winding 34a and electrically coupled to a horizontal deflection system 36. The horizontal deflection system 36 is also coupled to the direct current power supply 12. Output terminals 38 and 39 are coupled to yoke winding 40 mounted on the kinescope 18. The horizontal deflection system 36 is also coupled to a series combination of a winding 42a of a horizontal output and high voltage transformer 42 and a coupling capacitor 44. Output transformer 42 is isolated from the input power line and is referenced to chassis ground for safe operation.

When horizontal deflection system 36 is supplied with direct current potential from direct current power supply 12 and a drive signal from winding 34b of isolation transformer 34, a deflection current is produced in yoke winding 40 and a pulse is produced across winding 42a of high voltage transformer 42.

A direct current power supply 47 includes a winding 42b, magnetically coupled to winding 42a of high voltage transformer 42. Winding 42b includes a first terminal coupled to reference potential and another terminal coupled to the anode of a rectifier diode 46. The cathode of diode 46 is coupled through a filter capacitor 48 to reference potential. The cathode of diode 46 provides a source of direct current potential (B+) when pulses are produced by winding 42b. The cathode of diode 46 is also coupled to the anode of a blocking diode 50. The cathode of diode 50 is coupled to the input terminal 30 of horizontal oscillator 32.

A winding 42c of high voltage transformer 42 has a first terminal coupled to reference potential and another terminal coupled to a high voltage multiplier and rectifier 52. The output terminal 54 is coupled to the ultor electrode of kinescope 18. High voltage multiplier and rectifier 52 produces a high voltage direct current potential at the ultor electrode of the kinescope 18 when pulses are produced by winding 42c of high voltage transformer 42.

In operation, when off-on switch 16 is closed, an alternating current is provided to the series combination of degaussing winding 14 and the positive temperature coefficient resistor 15. initially, the resistance of the positive temperature coefficient resistor 15 is relatively low, thereby providing for a relatively high magnitude alternating current flow through winding 14. As current flows through resistor 15, the temperature of resistor 15 is elevated, thereby increasing its resistance and decreasing the current flow through winding 14. The reduction in current flow through winding 14 is exponential and decreases after a predetermined period to a level such that the flux produced by winding 14 is minimal. This period of decay of the current through the winding 14 is commonly referred to as the degaussing interval.

During the degaussing interval the metal components of the kinescope 18 are demagnetized and thus provide for a desired degree of purity of the color field of the kinescope 18 during the period following the degaussing interval as long as the television receiver is not moved. In addition, during the degaussing interval the flux generated by the winding 14 is coupled to secondary winding 20 and provides for a pulsating direct current potential at the cathode of diode 22. The first few pulsations of the potential at the cathode of diode 22 provide for a charging of capacitor 28 through resistor 26 but not through diode 24 since diode 24 is reverse biased by the potential at the cathode of diode 22. Subsequent to the first few pulsations, the potential across the capacitor 28 is greater than the peak potential produced at the cathode of diode 22. Therefore, after the first few pulsations no current flows through diode 22 and the flux produced by winding 14 ceases to be non-symmetrically distorted by conduction of half-wave rectifier 22 and normal degaussing can be accomplished.

The first few pulsations of the potential at the cathode of diode 22 and subsequent to the first pulsations, the potential across capacitor 28 via diode 24 is coupled through section 16c of off-on switch 16 to input terminal 30 of horizontal oscillator 32. This direct current potential at terminal 30 of horizontal oscillator 32 is decoupled from the load impedances coupled to B+ by means of diode 50, thereby providing for maximum current into the horizontal oscillator 32.

It can therefore be seen that during the degaussing interval pulsating direct current potential is supplied to horizontal oscillator 32 thereby providing for the generation of drive signals across winding 34b of isolation transformer 34. With sections 16a and 16b of off-on switch 16 closed, the direct current power supply 12 produces a direct current which is coupled to the horizontal deflection system 36. With direct current and drive signals supplied to the horizontal deflection system 36, deflection current is produced in the yoke 40 and pulses are produced by the winding 42a of high voltage transformer 42.

The pulses produced across winding 42a produce pulses across windings 42b and 42c. The diode 46 rectifies pulses produced by winding 42b and develops a direct current potential across filter capacitor 48, thereby providing a source of B+. This B+ is coupled through the diode 50 to terminal 30 of horizontal oscillator 32.

By a proper choice of components, the B+ produced across filter capacitor 48 will be at a level capable of sustaining the operation of the horizontal oscillator 32 before the capacitor 28 discharges below a potential which will sustain operation of horizontal oscillator 32. Therefore it can be seen that start-up of the horizontal oscillator 32 can be provided by means of the secondary winding 20 magnetically coupled to the degaussing winding 14.

Another function of the capacitor 28 is to provide for a storage of sufficient charge after the off-on switch 16 is open such that if the off-on switch 16 is reclosed before the positive temperature coefficient resistor 15 can cool to a level which would provide for a normal degaussing interval, capacitor 28 could provide sufficient B+ to the horizontal oscillator 32 to reinstate normal operation of the horizontal oscillator 32. This is accomplished by the charging of capacitor 28 through diode 50 and resistor 26 after any initial charge on capacitor 28 may have been utilized by oscillator 32 or leaked off.

FIG. 2 is a lateral section view of a kinescope magnetic shield and degaussing winding assembly 60. Elements performing the same function as elements in FIG. 1 are numbered the same as in FIG. 1.

A magnetic shield 62 is mounted on kinescope 18 to provide for shielding of the metal components of the kinescope from magnetic fields originating outside of the kinescope. The degaussing winding 14 is mounted on the magnetic shield 62 to degauss the magnetic shield and metal components of the kinescope during a degaussing interval referred to in the description of FIG. 1.

The degaussing winding conforms to the periphery of the faceplate 68 of the kinescope 18, and preferably has an insulation material wrapped around the coil throughout its periphery. In this embodiment a secondary winding 20 having the same perimeter measurement as the degaussing winding is coupled in close proximity to the degaussing winding 14 and both windings are wrapped within an insulation material to prevent abrasion of the wire by the shield 62.

Leads 64a and 64b are connected to winding 14 and leads 66a and 66b are connected to winding 20 to provide for connection of windings 14 and 20 to the circuit of FIG. 1.

During operation, flux generated by the degaussing winding 14 is coupled to the magnetic shield 62 and the metal components of the kinescope 18, thereby providing for degaussing of these items during the degaussing interval. The flux generated by the degaussing winding 14 is also coupled to secondary winding 20 and provides for a potential between terminals 66a and 66b required to accomplish start-up as described in FIG. 1.

Although only one configuration of degaussing coil mounting with respect to the magnetic shield is shown in FIG. 2, numerous other configurations would yield the advantages of the invention is accordance with that described in FIG. 1. For example, the degaussing winding 14 could comprise a pair of windings electrically connected together but disposed on opposite sides of kinescope 18 and comprise circular, elliptical or saddle shape structures extending backwards from the faceplate and shadowmask region of kinescope 18 as is well known in the art. In order to practice the invention with these other arrangements it is required that winding 20, or windings 20, be placed in a magnetically-coupled relation to winding or windings 14 so that magnetic flux from the latter induces an alternating current voltage in the former.

What is claimed is:

1. In a television receiver, a start-up power supply comprising:
    a degaussing winding mounted in operating proximity to a television picture tube for developing a degaussing flux in said picture tube during a degaussing interval; means for coupling said degaussing winding to a first source of varying amplitude alternating current potential.
    a secondary winding coupled to said degaussing winding for developing a second alternating current potential proportional to the amplitude of said degaussing flux during said degaussing interval; and
    power supply means coupled to said secondary winding for developing a first direct current potential during said degaussing interval.

2. In a television receiver, a start-up power supply comprising:
- display means;
- means including a degaussing winding coupled to said display means for developing a degaussing flux in the proximity of said display means during a degaussing interval;
- means for coupling said degaussing winding to a first source of alternating current potential.
- a secondary winding coupled to said degaussing winding for developing a second alternating current potential proportional to the amplitude of said degaussing flux during said degaussing interval;
- power supply means coupled to said secondary winding for developing a first direct current potential during said degaussing interval;
- oscillator means coupled to said power supply means for generating a drive signal in response to said first direct current potential;
- means including a deflection circuit coupled to said oscillator means for developing a second source of direct current potential for sustaining the generation of said drive signal after said degaussing interval; and means for coupling said deflection circuit to said source of alternating current potential.

3. A start-up power supply according to claim 2 wherein said means including a deflection circuit includes a blocking diode coupled between said second source of direct current potential and said oscillator means for preventing loading of said power supply means by said second source of direct current potential.

4. A start-up power supply according to claim 3 wherein said power supply means includes a rectifying diode.

5. In a television receiver, a start-up power supply comprising:
- display means;
- means including a degaussing winding coupled to said display means for developing a degaussing flux in the proximity of said display means during a degaussing interval; means for coupling said degaussing winding to a first source of alternating current potential.
- a secondary winding coupled to said degaussing winding for developing a second alternating current potential proportional to the amplitude of said degaussing flux during said degaussing interval;
- means including a power supply coupled to said secondary winding for providing a first direct current potential;
- oscillator means coupled to said power supply means for generating a drive signal in response to said first direct current potential;
- means including a deflection circuit coupled to said oscillator means for developing a second source of direct current potential for sustaining the generation of said drive signal after said degaussing interval; and means for coupling said deflection circuit to said source of alternating current potential.

6. A start-up power supply according to claim 5 wherein said means including a deflection circuit includes a blocking diode coupled between said second source of direct current potential and said oscillator means for preventing loading of said means including a power supply by said second source of direct current potential.

7. A start-up power supply according to claim 6 wherein said means including a power supply includes a rectifying diode coupled to said secondary winding for rectifying said first alternating current potential to provide said first direct current potential.

8. A start-up power supply according to claim 7 wherein said means including a degaussing winding includes a positive temperature coefficient resistor which increases resistance from a predetermined resistance value when said source of alternating current potential is coupled to said television receiver.

9. A start-up power supply according to claim 8 wherein said means including a power supply further includes means including a charge capacitor coupled to said oscillator and said rectifying diode for storing a charge during a first interval when said alternating current potential is coupled to said television receiver and for providing said first direct current potential to said oscillator means when said source of alternating current potential is decoupled from said television receiver for a second interval during which said second direct current potential is dissipated and during which said positive temperature coefficient resistor fails to return to said predetermined resistance.

10. A start-up power supply according to claim 9 wherein said means including a power supply further includes a charging resistor coupled to said charge storage capacitor, said oscillator means and said rectifying diode for providing a controlled charging rate for said charge storage capacitor.

11. A start-up power supply according to claim 10 wherein said means including a power supply further includes a blocking diode coupled to said charge storage capacitor, said oscillator means and said rectifier means for preventing loading of said secondary winding in excess of that provided by said charging resistor and providing an efficient path for transfer of charge from said charge storage capacitor to said oscillator means.

* * * * *